US012608152B2

(12) United States Patent　　　　(10) Patent No.:　US 12,608,152 B2
Onusko et al.　　　　　　　　　　　(45) Date of Patent:　　Apr. 21, 2026

(54) SYSTEMS AND METHODS FOR LOW COST DATA INDEXING

(71) Applicant: Smarsh, Inc., Portland, OR (US)

(72) Inventors: John Onusko, Portland, OR (US); Gopalakrishnan Ramanujam, Portland, OR (US); Gregory Breeze, Portland, OR (US)

(73) Assignee: SMARSH INC., Portland, OR (US)

( * ) Notice: Subject to any disclaimer, the term of this patent is extended or adjusted under 35 U.S.C. 154(b) by 0 days.

(21) Appl. No.: 18/545,630

(22) Filed: Dec. 19, 2023

(65) Prior Publication Data

US 2025/0199708 A1　　　Jun. 19, 2025

(51) Int. Cl.
G06F 3/06　　　　　　(2006.01)

(52) U.S. Cl.
CPC .......... *G06F 3/0652* (2013.01); *G06F 3/0611* (2013.01); *G06F 3/0649* (2013.01); *G06F 3/0685* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 6,321,238 B1 * | 11/2001 | Putzolu | .................... G06F 16/27 |
| 6,341,340 B1 * | 1/2002 | Tsukerman | ............. G06F 16/27 |
| | | | 707/E17.007 |
| 8,443,157 B1 * | 5/2013 | Reiner | .................. G06F 3/0653 |
| | | | 711/E12.002 |
| 8,996,450 B1 * | 3/2015 | Rubio | ................... G06F 3/0631 |
| | | | 707/602 |
| 9,043,530 B1 * | 5/2015 | Sundaram | ............. G06F 3/0656 |
| | | | 711/158 |
| 9,639,539 B1 | 5/2017 | Devta et al. | |

(Continued)

FOREIGN PATENT DOCUMENTS

CN　　　　110531938　A　 * 12/2019

OTHER PUBLICATIONS harkiran78, "What is Machine Learning?", Dec. 8, 2022, pp. 1-14, https://web.archive.org/web/20221208001831/https://www.geeksforgeeks.org/what-is-machine-learning/ (Year: 2022).*

(Continued)

*Primary Examiner* — Christopher D Birkhimer
(74) *Attorney, Agent, or Firm* — Bradley Arant Boult Cummings LLP; Adam J. Thompson, Esq.

(57)　　　　　　　　ABSTRACT

A system for data indexing includes memory and at least one computing device in communication with the memory. The computing device can store data objects in the memory. The computing device can assign an importance level to, or determine an applicable policy for, each data object by at least analyzing each data object to determine an importance level for each data object, designate each data objects having a high importance level as a first-tier data object, and designating each data object having a low importance level as a second-tier data object. The computing device can store subject data for the data objects by at least storing a first amount of subject data for each first-tier data object and a second amount of subject data for each second-tier data object, where the second amount of subject data is less than the first amount of subject data.

18 Claims, 6 Drawing Sheets

(56)                References Cited

U.S. PATENT DOCUMENTS

| | | | | |
|---|---|---|---|---|
| 10,402,731 | B1 | 9/2019 | Cosic | |
| 10,921,991 | B1* | 2/2021 | Olson | G06F 3/0619 |
| 2006/0004957 | A1* | 1/2006 | Hand, III | G06F 12/0866 |
| | | | | 711/E12.019 |
| 2009/0043831 | A1* | 2/2009 | Antonopoulos | G06F 3/0614 |
| 2009/0276588 | A1* | 11/2009 | Murase | G06F 3/0665 |
| | | | | 711/E12.071 |
| 2010/0269015 | A1* | 10/2010 | Borchers | G06F 12/0813 |
| | | | | 710/308 |
| 2011/0161784 | A1* | 6/2011 | Selinger | G06F 11/1016 |
| | | | | 714/E11.002 |
| 2011/0282830 | A1 | 11/2011 | Malige et al. | |
| 2012/0166749 | A1* | 6/2012 | Eleftheriou | G06F 3/0616 |
| | | | | 711/E12.002 |
| 2012/0185648 | A1* | 7/2012 | Benhase | G06F 3/0685 |
| | | | | 711/E12.002 |
| 2012/0246403 | A1* | 9/2012 | McHale | G06F 3/0647 |
| | | | | 711/E12.019 |
| 2012/0290768 | A1* | 11/2012 | Rubowitz | G06F 3/065 |
| | | | | 711/E12.008 |
| 2012/0297122 | A1* | 11/2012 | Gorobets | G06F 3/068 |
| | | | | 711/E12.008 |
| 2013/0124780 | A1* | 5/2013 | Baderdinni | G06F 3/0649 |
| | | | | 711/112 |
| 2013/0297873 | A1* | 11/2013 | Hyde, II | G06F 3/0665 |
| | | | | 711/117 |
| 2014/0156967 | A1* | 6/2014 | Meir | G06F 3/061 |
| | | | | 711/202 |
| 2015/0052395 | A1* | 2/2015 | Wipfel | G06F 11/1451 |
| | | | | 714/19 |
| 2015/0121024 | A1* | 4/2015 | Kolvick | G06F 16/1727 |
| | | | | 711/162 |
| 2015/0199129 | A1* | 7/2015 | Nair | G06F 3/0644 |
| | | | | 711/114 |
| 2015/0220385 | A1* | 8/2015 | Wood | G06F 3/061 |
| | | | | 714/6.24 |
| 2015/0227316 | A1* | 8/2015 | Warfield | G06F 3/0688 |
| | | | | 711/162 |
| 2015/0347040 | A1* | 12/2015 | Mathur | G06F 3/0659 |
| | | | | 711/103 |
| 2015/0347296 | A1* | 12/2015 | Kotte | G06F 3/0679 |
| | | | | 711/103 |
| 2016/0196216 | A1* | 7/2016 | Lee | G06F 3/0631 |
| | | | | 711/170 |
| 2019/0005154 | A1 | 1/2019 | Tripathi et al. | |
| 2021/0064250 | A1* | 3/2021 | Neff | G11B 5/00813 |
| 2021/0064272 | A1* | 3/2021 | Patel | G06F 12/0811 |
| 2021/0064535 | A1* | 3/2021 | Han | G06F 3/0611 |
| 2021/0081125 | A1* | 3/2021 | Patel | G06F 11/2056 |
| 2021/0141565 | A1* | 5/2021 | Jin | G06F 3/0659 |
| 2021/0342088 | A1 | 11/2021 | Gong et al. | |
| 2023/0105067 | A1* | 4/2023 | Wang | G06F 3/067 |
| | | | | 711/154 |

OTHER PUBLICATIONS

Anonymous, "Machine Learning", Feb. 3, 2023, pp. 1-11, https://web.archive.org/web/20230203005813/https://www.hyperscience.com/knowledge-base/machine-learning/ (Year: 2023).*

Ed Burns, "machine learning", Jan. 6, 2022, pp. 1-8, https://web.archive.org/web/20220106023502/https://www.techtarget.com/searchenterpriseai/definition/machine-learning-ML (Year: 2022).*

Wikipedia, "Machine learning", May 5, 2023, pp. 1-34, https://en.wikipedia.org/w/index.php?title=Machine_learning&oldid=1153245979 (Year: 2023).*

International Search Report and Written Opinion received in International application No. PCT/US2024/053432 mailed on Dec. 4, 2024.

* cited by examiner

COMPUTING ENVIRONMENT 101

PROCESSOR(S) 102

MEMORY 104

COMMUNICATION SERVICE 106

SORTING SERVICE 108

DATA STORE 110

DATA OBJECTS 112

HOT TIER SUBJECT DATA INDEX 114

WARM TIER SUBJECT DATA INDEX 116

COLD TIER SUBJECT DATA INDEX 118

NETWORK 120

COMPUTING DEVICE 130

INPUT DEVICE 132

DISPLAY 134

APPLICATION 136

SYSTEMS AND METHODS FOR LOW COST DATA INDEXING

TECHNICAL FIELD

The present systems and methods relate generally to indexing data and, in particular, low cost indexing of data (e.g., subject data) associated with a data set.

BACKGROUND

Cloud computing has transformed the way businesses operate by providing on-demand access to a vast array of computing resources such as storage, processing power, and applications. One of the major advantages of cloud computing is that it enables businesses to scale their computing infrastructure quickly and efficiently without incurring the significant upfront costs associated with traditional on-premise data centers.

To increase the organization and searchability of data stored in cloud computing environments (or other large data sets), indexes of metadata or other data associated with the stored data can be used. As will be appreciated, the metadata or other data can include various attributes and/or descriptive information relating to the underlying stored data. However, the indexes of metadata or other data can become exceedingly large, even outsizing the underlying stored data. This can, in turn, result in very expensive data storage costs to store the indexes.

Accordingly, there is an existing need for systems and methods for providing organized and searchable data sets while decreasing the storage costs associated with the data sets and/or indexes of metadata or other data associated with the data sets.

BRIEF SUMMARY OF THE DISCLOSURE

Briefly described, aspects of the present disclosure generally relate to systems and methods for indexing data. For example, the disclosed technology includes low cost indexing of subject data associated with stored data, as described more fully herein.

The disclosed technology includes a method. The method can comprise: analyzing, via one of one or more computing devices, each of a plurality of data objects to determine an initial importance level (e.g., an initial policy for indexing parameters, storage parameters, and/or retention parameters) for each of the plurality of data objects; designating, via one of the one or more computing devices: each of the plurality of data objects having a high initial importance level as a first-tier data object; and each of the plurality of data objects having a low initial importance level as a second-tier data object; and storing, in a data store, subject data for the plurality of data objects by at least: for each first-tier data object, storing subject data associated with the corresponding first-tier data object according to first-tier indexing parameters; and for each second-tier data object, storing subject data associated with the corresponding second-tier data object according to second-tier indexing parameters, the second-tier indexing parameters being different from the first-tier indexing parameters; and in response to determining, via one of the one or more computing devices and for a particular data object of the plurality of data objects, that a subsequent importance level (e.g., a subsequent or updated policy for indexing parameters, storage parameters, and/or retention parameters that is different from the initial policy)

is different from the initial importance level, re-designating, via one of the one or more computing devices, the particular data object to a different tier.

The first-tier indexing parameters can comprise a first amount of subject data associated with the corresponding first-tier data objects and the second-tier indexing parameters can comprise a second amount of subject data associated with the second-tier data objects, the second amount of subject data being less than the first amount of subject data.

Re-designating the particular data object to a different tier can comprise: in response to determining, via one of the one or more computing devices, that the subsequent importance level of the particular data object is less than the initial importance level of the particular data object: re-designating, via one of the one or more computing devices, the particular data object from a first-tier data object to a second-tier data object; and storing, via one of the one or more computing devices and in the data store, the subject data associated with the particular data object according to second-tier indexing parameters; and in response to determining, via one of the one or more computing devices, that the subsequent importance level of the particular data object is greater than the initial importance level of the particular data object: re-designating, via one of the one or more computing devices, the particular data object from a first-tier data object to a second-tier data object; and storing, via one of the one or more computing devices and in the data store, the subject data associated with the particular data object according to first-tier indexing parameters.

Re-designating the particular data object from a first-tier data object to a second-tier data object can comprise deleting at least a portion of the subject data associated with the particular data object.

Re-designating the particular data object from a second-tier data object to a first-tier data object can comprise generating or obtaining, via one of the one or more computing devices, additional subject data associated with the particular data object.

The first-tier indexing parameters can comprise storing the subject data associated with the corresponding first-tier data objects on a first storage medium having a first data access speed and the second-tier indexing parameters comprise storing the subject data associated with the corresponding first-tier data objects on a second storage medium having a second data access speed, the second data access speed being less than the first data access speed.

Re-designating the particular data object from a first-tier data object to a second-tier data object can comprise moving, via one of the one or more computing devices, storage of the subject data associated with the particular data object from the first storage medium to the second storage medium.

Re-designating the particular data object from a second-tier data object to a first-tier data object can comprise moving, via one of the one or more computing devices, storage of the subject data associated with the particular data object from the second storage medium to the first storage medium.

The disclosed technology can include a system. The system can comprise: memory and at least one computing device in communication with the memory. The at least one computing device can be configured to: analyze each of a plurality of data objects to determine an initial importance level for each of the plurality of data objects; designate each of the plurality of data objects having a high initial importance level as a first-tier data object; designate each of the plurality of data objects having a low initial importance level as a second-tier data object; store subject data for the plurality of data objects by at least: for each first-tier data object, storing, in the memory, subject data associated with the corresponding first-tier data object according to first-tier indexing parameters; and for each second-tier data object, storing, in the memory, subject data associated with the corresponding second-tier data object according to second-tier indexing parameters, the second-tier indexing parameters being different from the first-tier indexing parameters; and in response to determining, for a particular data object of the plurality of data objects, that a subsequent importance level is different from the initial importance level, re-designate the particular data object to a different tier.

The first-tier indexing parameters can comprise a first amount of metadata associated with the corresponding first-tier data objects and the second-tier indexing parameters comprise a second amount of metadata associated with the second-tier data objects; assigning an importance level to each of the plurality of data objects can comprise further comprise: assigning each of the plurality of data objects having an intermediate importance level as a third-tier data object; and storing subject data for the plurality of data objects can further comprise: for each third-tier data object, storing, via the at least one computing device and in the data store, a third amount of subject data associated with the corresponding third-tier data object, the third amount of subject data being less than the first amount of subject data and greater than the second amount of subject data.

Determining the importance level for each of the plurality of data objects can comprise determining, for each of the plurality of data objects, a likelihood that the corresponding data object will be accessed.

Determining the importance level for each of the plurality of data objects can comprise determining a relevance of each of the plurality of data objects to a particular purpose or scenario.

Determining the relevance of each of the plurality of data objects to the particular purpose or scenario can be based at least in part on a source of the data object, a sender of the data object, a recipient of the data object, a file creation date of the data object, a most recent modification data of the data object, a transmission date of the data object, a receipt date of the data object, a version of the data object, an existence or nonexistence of one or more keywords included in the data object, a term frequency of one or more terms, or cross-references to a given data object by others of the plurality of data objects.

Determining the relevance of each of the plurality of data objects to the particular purpose or scenario can be based at least in part by applying a machine learning algorithm to the plurality of data objects.

The disclosed technology includes a non-transitory computer-readable medium having instructions stored thereon that, when executed by at least one computing device, cause the at least one computing device to: analyze each of a plurality of data objects to determine an initial importance level for each of a plurality of data objects; designate each of the plurality of data objects having a high initial importance level as a first-tier data object; designate each of the plurality of data objects having a low initial importance level as a second-tier data object; and store subject data for the plurality of data objects by at least: for each first-tier data object, storing, in a memory, subject data associated with the corresponding first-tier data object according to first-tier indexing parameters; and for each second-tier data object, storing, in the memory, subject data associated with the corresponding second-tier data object according to second-tier indexing parameters, the second-tier indexing parameters being different from the first-tier indexing parameters; and in response to determining, for a particular data object of the plurality of data objects, that a subsequent importance level is different from the initial importance level, re-designate, via one of the one or more computing devices, the particular data object to a different tier.

Determining the importance level for each of the plurality of data objects can comprise determining an importance score for each of the plurality of data objects to a particular purpose or scenario; assigning each of the plurality of data objects having a high importance level as a first-tier data object can comprise determining that the importance score for a given data object is greater than or equal to a first threshold; and assigning each of the plurality of data objects having a low importance level as a second-tier data object can comprise determining that the importance score for a given data object is less than a second threshold.

The instructions, when executed by the at least one computing device, can further cause the at least one computing device to: assign each of the data objects having an intermediate importance level as a third-tier data object by at least determining that the importance score for a given data object is less than the first threshold and is greater than or equal to the second threshold.

The instructions, when executed by the at least one computing device, can further cause the at least one computing device to: receive, via the at least one computing device, a search query; search, via the at least one computing device, the subject data for the plurality of data objects to identify one or more data objects having a greatest relevance to the search query; and return, via the at least one computing device, an indication of the one or more data objects having the greatest relevance to the search query.

The first-tier indexing parameters can comprise a first amount of metadata associated with the corresponding first-tier data objects and the second-tier indexing parameters can comprise a second amount of metadata associated with the second-tier data objects; and the second amount of subject data can have a file size that is less than less than a file size of the first amount of subject data.

The first-tier indexing parameters can comprise a first amount of metadata associated with the corresponding first-tier data objects and the second-tier indexing parameters can comprise a second amount of metadata associated with the second-tier data objects; and the first amount of subject data can comprise different types of subject data as compared to the second amount of subject data.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

US 12,608,152 B2

5

Figure 3:
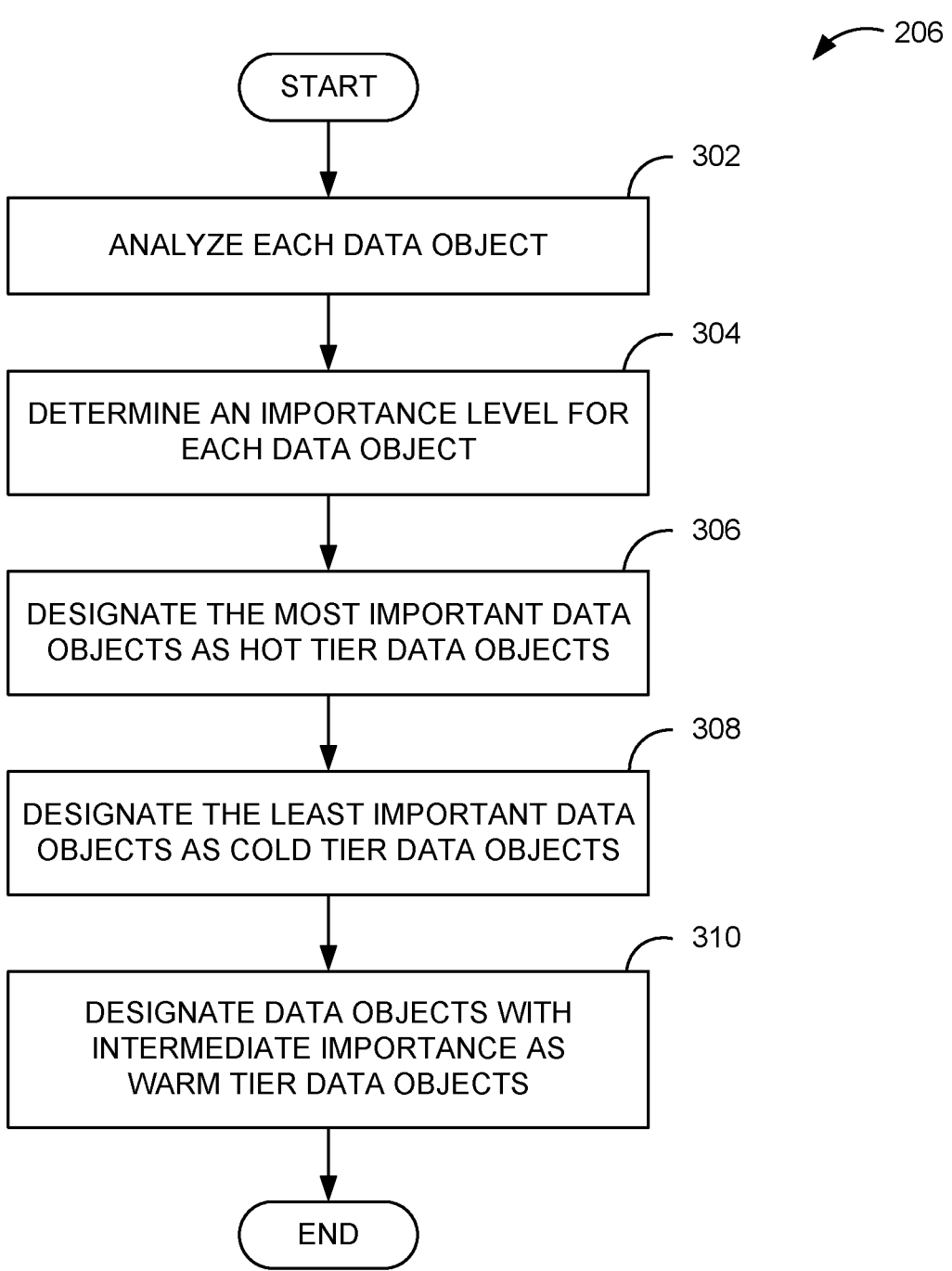
Figure 4:
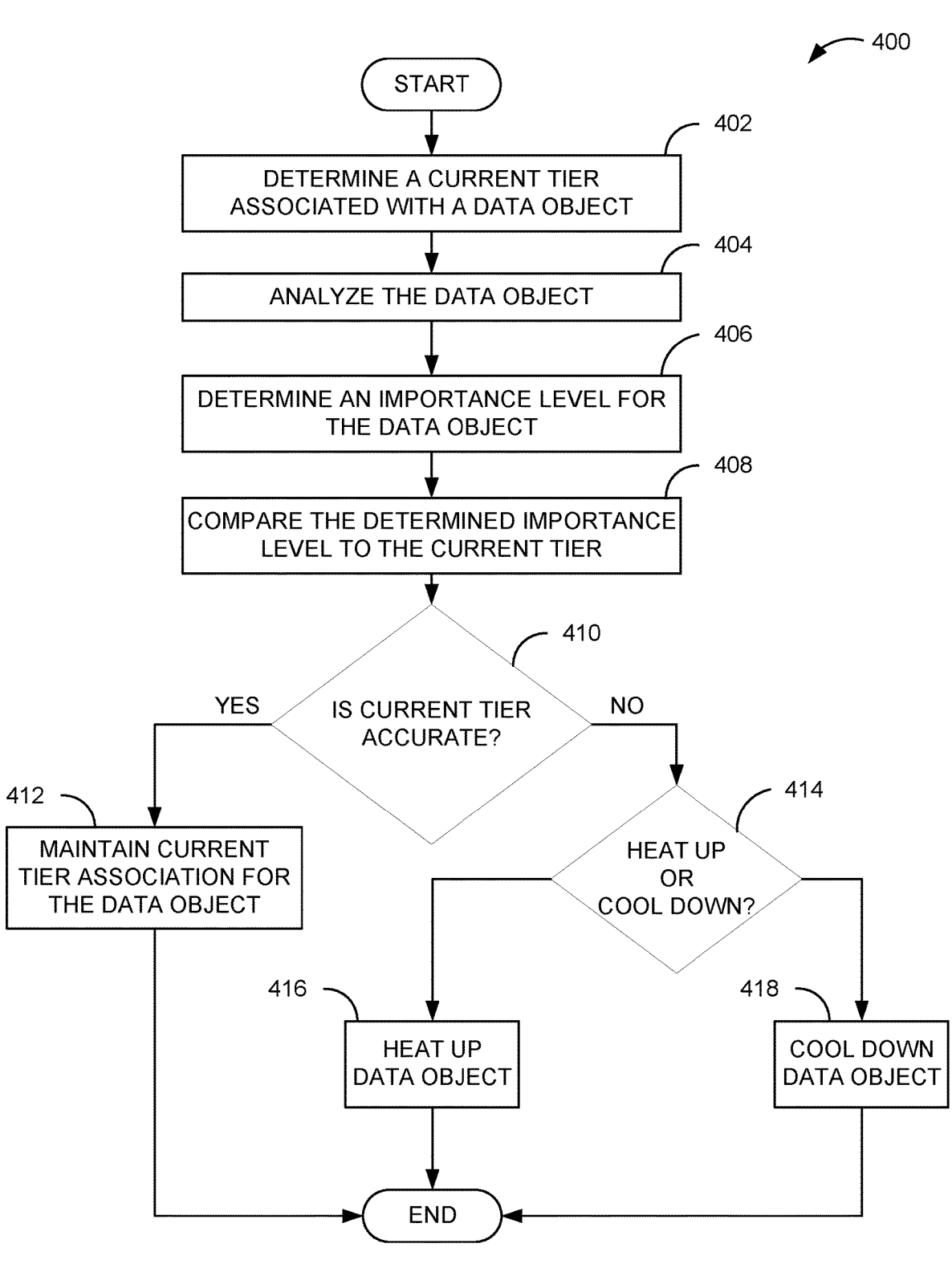
Figure 5:
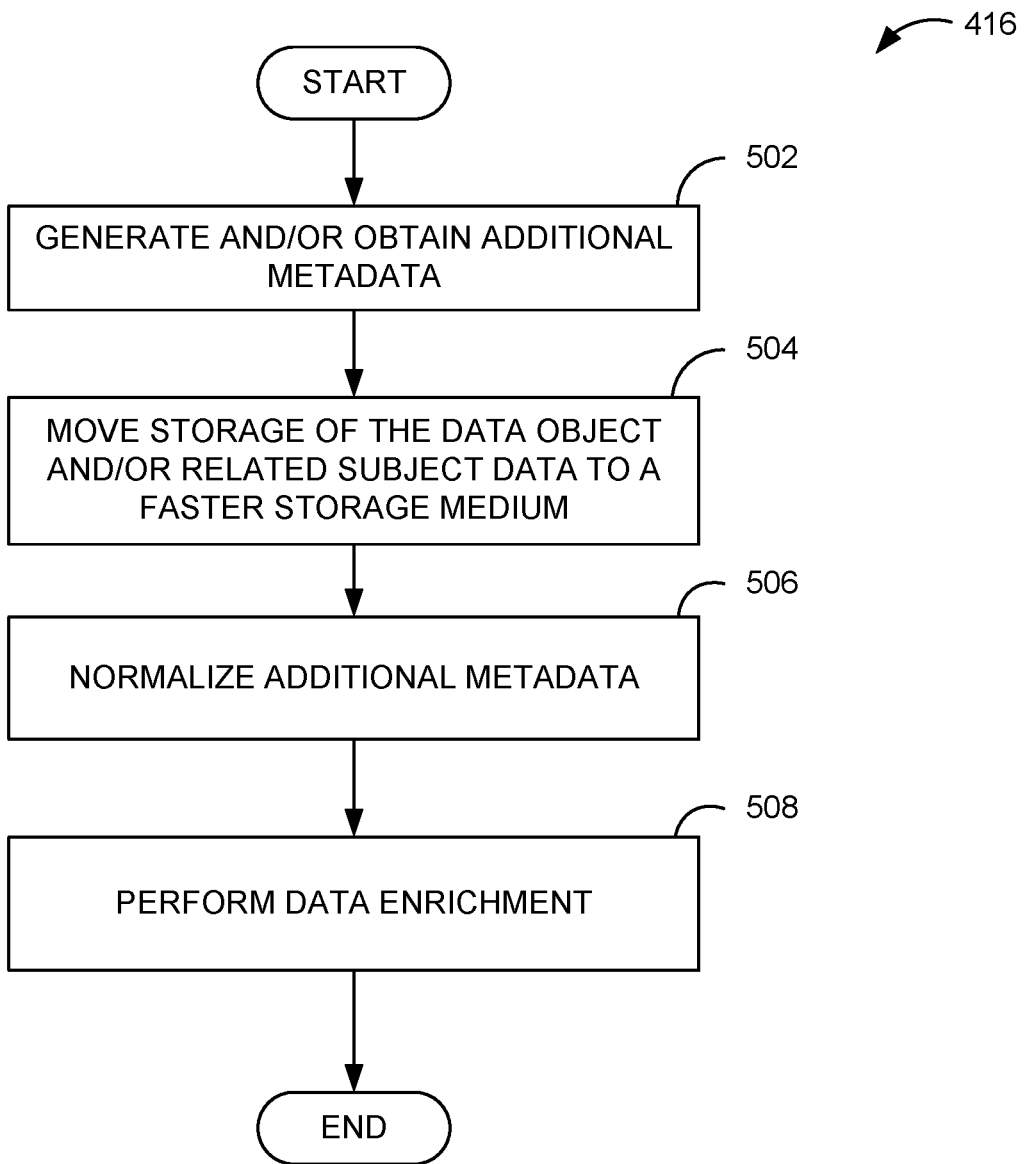
Figure 6:
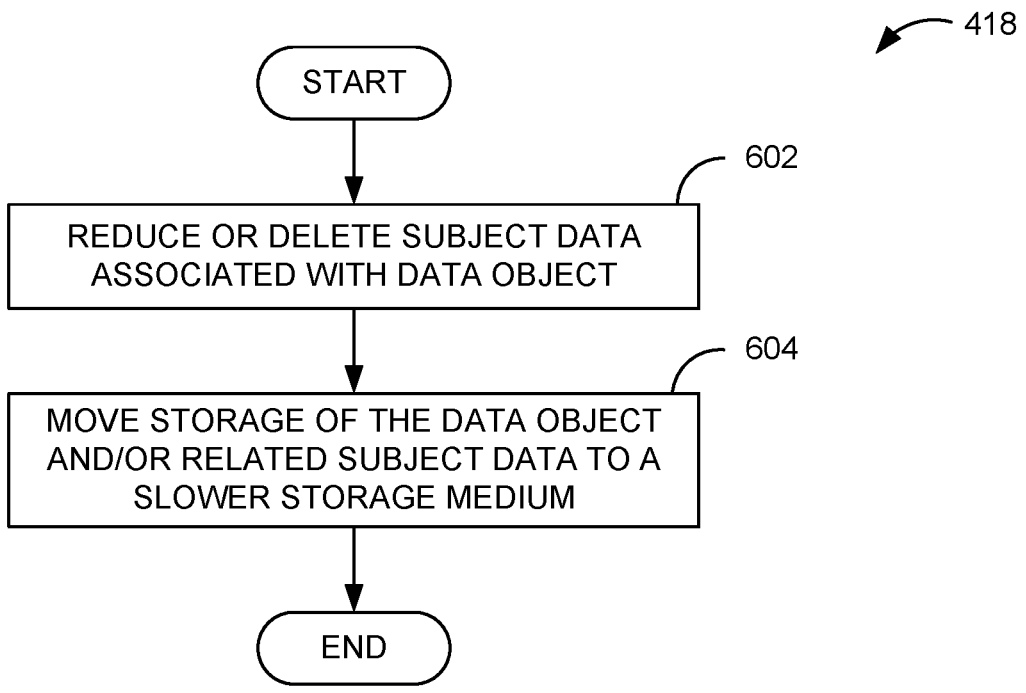

FIG. 3 shows an example method for assigning importance levels to data objects, in accordance with the disclosed technology;

FIG. 4 shows an example method for determining whether the tier to which a stored data object (e.g., data object 112) is associated is still accurate, in accordance with the disclosed technology;

FIG. 5 shows an example method for heating up data objects, in accordance with the disclosed technology; and FIG. 6 shows an example method for cooling down data objects, in accordance with the disclosed technology.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein, "data object" generally refers to any data received by or acted upon by the present systems and processes. The use of the term "based on" includes "based at least in part on" and is not meant to be limiting.

Overview

Aspects of the present disclosure generally relate to indexing data and, in particular, low cost indexing of communication text, text extracted from communication attachments or other attachments of files, and/or metadata associated with a data set or data store (e.g., metadata associated with the communication text and/or the text extracted from communication attachments or files). The term "subject data" is used herein to refer to any combination of communication text, text extracted from communication attachments or other attachments of files, and/or metadata associated with a data object, a data set, or a data store.

The disclosed technology can include systems and methods for performing various functions including, but not limited to, electronic discovery, supervision, and archiving. For example, the data set discussed herein can refer to documents associated with electronic discovery and/or various communications or other documents. The disclosed systems and methods can include storing the data set (e.g., communication data), and associating the various data objects of the data set using one of a plurality of tiers. The various tiers can relate to a likelihood that the corresponding data objects will be will need to be accessed (e.g., for a particular purpose). The plurality of tiers can include a hot tier and a cold tier. The hot tier can refer to data objects that are most likely to be accessed (e.g., for the particular purpose). The cold tier can refer to data objects that are least likely to be accessed (e.g., for the particular purpose). The plurality of tiers can, in some instances, include a warm tier, which can refer to data objects that more likely to be accessed (e.g., for the particular purpose) than the cold tier objects but less likely to be accessed than the hot tier objects. As will be appreciated by those having skill in the art, the disclosed technology is primarily described herein as including two or three tiers (e.g., hot, warm, and/or cold), but the disclosed technology is not so limited and can include any number of intermediate tiers (e.g., tiers that are between the hot or hottest tier or most-likely-to-be-accessed tier and the cold or coldest tier or least-likely-to-be-accessed tier).

The disclosed technology can include extracting or otherwise obtaining text or other data from at least some of the data set (e.g., text or other data extracted from one or more communication attachments of one or more files) and/or creating, generating, or otherwise obtaining metadata for at least some of the data set. Each tier can correspond to a different level of subject data associated with the corresponding data objects (e.g., communication text associated with the corresponding data objects, text extracted from one or more commination attachments of or associated with the corresponding data objects, and/or metadata associated with the corresponding data objects, the communication text associated therewith, or the metadata associated therewith).

For example, the disclosed technology can include creating, generating, extracting, or otherwise obtaining and storing a first amount of subject data for each data object associated with the hot tier, and the disclosed technology can include creating (or otherwise obtaining) and storing a second amount of subject data for each data object associated with the cold tier. The second amount of subject data can be less than the first amount of subject data. That is to say, because the hot tier is associated with data objects that are more likely to be accessed, aspects of the disclosed technology can include storing a larger amount of metadata or other subject data for each hot tier data object in contrast to the corresponding amount of subject data stored for colder tiers, thereby increasing the searchability and/or accessibility of the hot tier data objects (while also increasing the cost associated with the metadata index for the hot tier data objects). Further, because the cold tier is associated with data objects that are less likely to be accessed, aspects of the disclosed technology can include storing a smaller amount of target (or even no subject data or none of a certain type of subject data) for each cold tier data object in contrast to subject data stored in warmer tiers, which can decrease the cost associated with the subject data index of the cold tier data objects but will also decrease the searchability and/or accessibility of the cold tier data objects. Use of the terms less, more, large, larger, small, or smaller herein when referring to an amount of data stored for each tier are in comparison to other tiers, unless otherwise indicated.

Further still, the disclosed technology can include creating, generating, extracting, or otherwise obtaining and storing a third amount of subject data for each data object associated with the warm tier, and the third amount of subject data can be less than the first amount of subject data and greater than the second amount of subject data. That is to say, aspects of the disclosed technology can include storing an intermediate amount of subject data for each warm tier data object (e.g., an amount less than the amount for the hot tier and greater than the amount for the cold tier), thereby increasing the searchability and/or accessibility of the warm tier data objects as compared to the cold tier data objects while decreasing the cost associated with the subject data index for the warm tier data objects as compared to the cost associated with the subject data index for the hot tier data objects.

Examples of the Disclosed Technology

Figure 1:
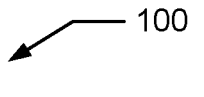
FIG. 1 illustrates an example data indexing system, in accordance with the disclosed technology.
Figure 1:
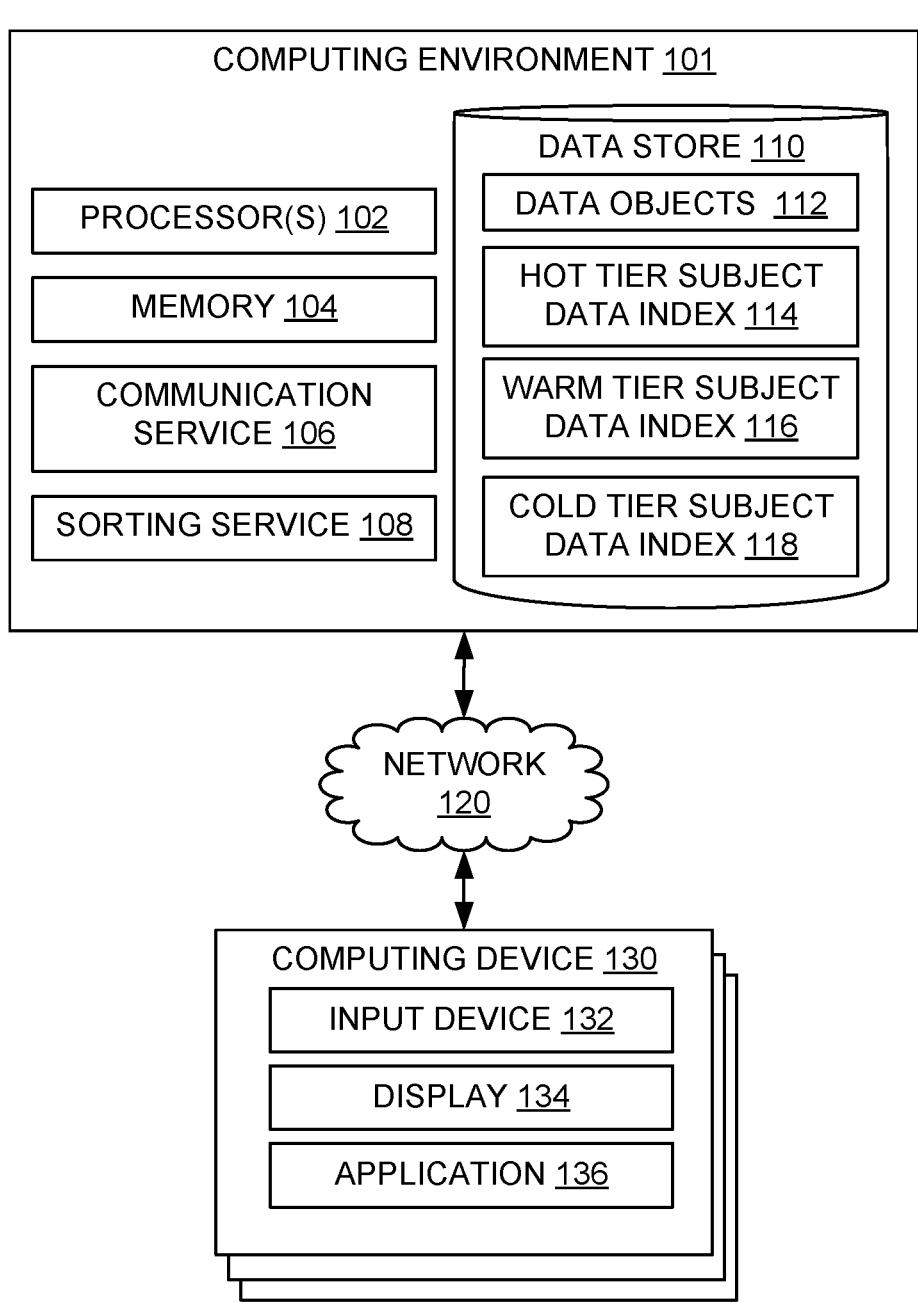

Referring now to the figures, for the purposes of example and explanation of the fundamental processes and components of the disclosed systems and method, reference is made to FIG. 1, which shows an example data indexing system 100. As will be understood and appreciated, the example data indexing system 100 shown in FIG. 1 represents merely one approach or embodiment of the present system, and other aspects are used according to various embodiments of the present system.

The system 100 can perform (e.g., via a search engine) index operations, classification or assignment of data objects to corresponding index tiers (e.g., hot, warm, cold), and/or retrieval of stored information via an index of metadata. A search engine can search the metadata and text of documents in a search index to determine which documents match search criteria without having to parse the document itself.

The system 100 can include a computing environment 101 and one or more computing device 130 that can communicate over a network 120. The elements of the computing environment 101 can be provided via one or more computing devices that can be arranged, for example, in one or more server banks or computer banks or other arrangements. Such computing device(s) can be located in a single installation or can be distributed among many different geographical locations. For example, the computing environment 101 can include a plurality of computing devices that together can include a hosted computing resource, a grid computing resource, and/or any other distributed computing arrangement. Alternatively or in addition, the computing environment 101 can correspond to an elastic computing resource where the allotted capacity of processing, network, storage, or other computing-related resources may vary over time.

The network 120 can include, for example, the Internet, one or more intranets, one or more extranets, one or more wide area networks (WANs), one or more local area networks (LANs), one or more wired networks, one or more wireless networks, any other suitable network(s), or any combination of two or more such networks. For example, the network 120 can be or include a satellite network, a cable network, an Ethernet network, or any other type of network.

The system can include a computing device 130, which can be any network-capable device including, but not limited to, a server, smartphone, laptop or desktop computer, tablet, smart accessory (for example, a smart watch or key fob), vehicle control system, or multimedia control system. The computing device 130 can be associated with a particular user account. The association can be based on an identifier of the computing device 130, such as, for example, a serial number, phone number, or networking address (for example, a MAC address). The computing environment 101 can associate the computing device 130 with a user account in response to determining that a user (and/or the computing device 13) has accessed the user account. The computing device 130 can include an application 136 for accessing various functions of the system 100 and/or for enabling collection of communication data or other data objects 112 from the computing device 130.

The computing device 130 can include a processor and memory. The computing device 130 can include a display 134 on which various user interfaces can be rendered by an application 136 to configure, monitor, and/or control various functions of the system 100. The application 136 can correspond to a web browser and a web page, a mobile app, a native application, a service, or other software that can be executed on the computing device 130. The application 136 can display information associated with processes of the system 100 and/or data stored thereby. The application 136 can transmit user inputs and/or data objects 112 to the computing environment 101. For example, the application 136 can collect emails, text messages, network activity, and/or other communication-related information from (or associated with) the computing device 130 and transmit the data to the computing environment 101. Alternatively or in addition, the application 136 can receive user input for initiating data index tiering (e.g., tiering of a subject data index), data supervision, data archiving, and/or data discovery processes described herein and can transmit the user input to the computing environment (e.g., in the form of a command that causes the computing environment 101 to initiate one or more corresponding actions).

The computing device 130 can include an input device 132 for providing inputs, such as requests and commands, to the computing device 130. The input devices 132 can include a keyboard, mouse, pointer, touch screen, speaker for voice commands, camera or light sensing device to reach motions or gestures, or other input devices. The application 136 can process the inputs and transmit commands, requests, or responses to the computing environment 101. Functionality of the application 136 can be determined based on a particular user account or other privilege level with which the computing device 130 is associated. For example, a first computing device 130 can be associated with an administrator user account and the application 136 of the first computing device 130 can be configured to permit access and viewing of data objects 112 from various user accounts and transmit commands to the computing environment 101 for controlling functions and processes thereof. Further, a second computing device 130 can be associated with an employee user account, and the application 136 of the second computing device can be configured to allow the computing device 130 to transmit data objects 112 to the computing environment 101 and to receive commands from the computing environment 101 (e.g., commands for controlling data storage, password and credential policies, etc.).

As shown in FIG. 1, the computing environment 101 can include a communication service 106, which can receive and transmit data to and from computing devices 130, other elements of the computing environment 101, and external systems, such as, for example, software applications, remote storage environments, and cloud-based services. The communication service 106 can receive, for example, data objects 112 (e.g., communication data), user inputs (e.g., from computing devices 130 or other sources), or the like. The communication service 106 can retrieve natural language data or other data items from the data store 110 and/or other data storage environments, such as, for example, data archives. The data store 110 can store various data that is accessible to the various elements of the computing environment 101. Some or all of the data stored in the data store 110 can be accessible to the computing device 130 and/or one or more external systems (e.g., on a secured and/or permissioned basis). Data stored at the data store 110 can include, but is not limited to, data objects 112 (e.g., communication data, electronic discovery documents) and subject data associated therewith. The data store 110 can be representative of a plurality of data stores 110 as can be appreciated.

Alternatively or in addition, a data archive (e.g., which can be a part of the data store 110) can include, for example, natural language data or document and corresponding subject data describing a plurality of events that occur over time and/or natural language data associated with one or more communication modalities. Alternatively or in addition, the communication service 106 can be configured to identify data (e.g., third-party data) relevant to a given data object 112 and/or can receive, create, generate, extract, or obtain data relevant to a given data object 112 and store that data as subject data associated with the data object 112. Such identification processes can be performed by, at least in part, applying one or more algorithms, machine learning models, or other techniques.

The communication service 106 can cause the computing device 130 to retrieve and share natural language data, data objects 112, or other data from a data archive or other storage environment. For example, the communication service 106 can retrieve, from a data archive, historical data of multi-party communications in which at least one party is associated with a particular entity, organization, or other criteria. The communication service 106 can intercept communications from any number of computing devices 130, user accounts, and other devices, systems, and accounts that transmit data over the network 120. For example, the communication service 106 can connect to a network appliance (e.g., a server, a network switch, a router) and can intercept any communication data transmitted thereby. Alternatively or in addition, the network appliance can be configured to perform inspection of packets and provide particular types (e.g., messaging, email, social media, etc.) of packets to the communication service 106. The communication service 106 can communicate with various services to receive or intercept data. The various services can be configured to communicate data to the communication service 106. As an example, an email service can be configured to provide the communication service 106 access to all correspondence sent over the email service. As used herein, the terms "receiving" and "intercepting" may be used to refer to intaking of data from one or more sources by the communication service 106.

The communication service 106 can capture audio files and apply one or more speech-to-text algorithms or techniques to generate textual string corresponding to natural language recorded in the audio files. The communication service 106 can receive, generate, create, extract and/or obtain target data associated with the audio files. For example, the communication service 106 can determine whether an audio file contains multiple speakers, determine a voice signature corresponding to each of the speakers, and generate metadata for the audio file and/or generate or extract text therefrom that identifies subsets of the audio file that correspond to each speaker. As a more specific example, the communication service 106 can capture an audio file corresponding to a phone call between a first computing device 130 and a second computing device 130, and the communication service 106 can analyze the audio file using a speech-to-text algorithm to generate a textual string corresponding to natural language recorded in the audio file. The communication service 106 can then generate subject data identifying the speakers whose voices were recorded in the audio file, identifying the likely sources of background noises recorded in the audio file, identifying a location of one or more of the speakers (e.g., based on the background noises and/or context from the words spoken by one or more of the speakers), a time of the call, a duration of the call, etc.

The communication service 106 can create, generate, extract, retrieve, or obtain subject data corresponding to data objects 112 and/or communications generated by the communication service 106. Non-limiting examples of subject data (e.g., metadata) include timestamps, geolocation information, network traffic information, device information (e.g., IP address, serial number, MAC address, firmware version, etc.), content type, communication duration, and access records (e.g., login, logout, and setting change events). The communication service 106 can, in response to receiving one or more data objects 112 (e.g., from a computing device 130), create, generate, extract, retrieve, or receive and store subject data associated with the data object(s) 112 (e.g., a timestamp of one or more communications, IP address of the computing device 130, and contact information of the sender or recipient).

The communication service 106 can configure and enforce various policies, such as, for example, data storage policies, data access policies, and data retention policies. For example, data associated with a higher tier (as discussed more fully herein) can have a retention policy or retention period that is different from (e.g., greater than) the retention policy or retention period for data associated with a lower tier.

The computing environment 101 can include one or more processors 102 and memory 104 storing instructions that, when executed by the one or more processors 102, causes the computing environment 101 to perform one or more actions, functions, methods, or the like, as described more fully herein. The computing environment 101 can include data store 110. The data store can be or include any data storage environment, such as, for example, data archives or a data lake. As will be appreciated, the data store 110 can include a plurality of data objects 112, and the data objects 112 can each be indicative of an electronic discovery document or file, a communication documents or file, or any other type of stored data. The data store 110 can include subject data associated with some or all of the data objects 112, and the subject data can be separated or tiered based on, as a non-limiting example, a level of importance (e.g., an importance rating) associated with each given data object 112 and/or a likelihood that each given data object will be accessed (e.g., by a cloud computing user, customer, or other third party). The subject data for the data objects 112 can be indexed into one of two or more indexes. For example, the data store 110 can include a hot tier subject data index 114 and a cold tier subject data index 118. The computing environment 101 can apply one or more policies to determine indexing parameters, storage parameters, and/or retention parameters. The computing environment 101 can compute, determine, or otherwise identify an appropriate policy (also referenced herein as an "importance level") by generating one or more scores predicting a likelihood that data in a data object 112 will be accessed and/or a frequency that the data in the data object 112 will be accessed. The computing environment 101 can combine the one or more scores predicting the likelihood by weighting the scores or by inputting the scores into an artificial intelligence or machine learning algorithm trained using historical information of data accesses in the computing environment.

The hot tier subject data index 114 can be or include an index of subject data associated with data objects 112 that are assigned a highest importance level (e.g., a first policy, which can have the broadest and most inclusive indexing parameters, storage parameters, and/or retention parameters as compared to other policies) and/or are most likely to be accessed. The data objects 112 associated with the hot tier subject data index 114 can be assigned the highest importance level and/or be most likely to be accessed in relation to a particular purpose, such as electronic discovery review, review of communications regarding a certain topic or the like.

The cold tier subject data index 11 can be or include an index of subject data associated with data objects 112 that are assigned a lowest importance level (e.g., a second policy, which can have the narrowest and least inclusive indexing parameters, storage parameters, and/or retention parameters as compared to other policies) and/or are least likely to be accessed. The data objects 112 associated with the cold tier subject data index 118 can be assigned the lowest importance level and/or be least likely to be accessed in relation to a particular purpose, such as electronic discovery review, review of communications regarding a certain topic or the like. Stated otherwise, the data objects 112 associated with the cold tier subject data index 118 can be assigned the lowest importance level and/or be least likely to be accessed at least in part because the cold tier data objects 112 do not relate to the particular purpose and/or the cold tier data objects 112 relate to an unimportant or inconsequential purpose (e.g., in relation to the particular purpose).

As an illustrative example, the particular purpose can be or include communications relating to a business. Thus, the computing environment 101 can be configured to assign to the hot tier a first data object 112 (e.g., an email) relating to a business transaction, and subject data associated with that first data object 112 can be indexed in the hot tier subject data index 114. Furthering this example, the computing environment 101 can be configured to assign to the cold tier a second data object 112 (e.g., an email) relating to the author making dinner plans with a family member, and subject data associated with the second data object 112 can be indexed in the cold tier subject data index 118.

As discussed elsewhere herein, the computing environment 101 can include one or more intermediate tiers. Each of the intermediate tiers can be or include an index of subject data associated with data objects 112 that are assigned an intermediate importance level (between the highest importance level and the lowest importance level) (e.g., a third policy, which can have indexing parameters, storage parameters, and/or retention parameters that are of an intermediate breadth and inclusivity as compared to the first and second policies) and/or are less likely to be accessed than hot tier data objects 112 but more likely to be accessed than the cold tier data objects 112. The one or more intermediate tiers can include a warm tier. Thus, continuing the above example, the computing environment 101 can be configured to assign to the warm tier a third data object 112 (e.g., an email) relating to the author making lunch plans with a business contact. That is, the computing environment 101 can be configured to determine that making lunch plans with a business contact is more germane to the particular purpose of conducting business than is making dinner plans with a family member, while also determining that making lunch plans with a business contact is less germane to the particular purpose of conducting business than is discussing a business transaction. Accordingly, subject data associated with the third data object 112 can be indexed in the warm tier subject data index 116.

The various subject data indexes (e.g., hot tier subject data index 114, warm tier subject data index 116, and/or cold tier subject data index 118) can have different amounts and/or types of subject data associated with each corresponding data object 112. For example, the more important a data object 112 is determined to be and/or the more likely a data object 112 is determined to be accessed, the larger the amount of subject data stored for that corresponding data object 112 can be. Stated otherwise, the computing environment 101 can be configured to create or obtain a first amount of subject data for data objects 112 assigned to the hot tier and can be configured to create or obtain a second amount of subject data for data objects 112 assigned to the cold tier. The second amount of subject data can be less than the first amount of subject data. As such, the hot tier subject data index 114 can be larger than the cold tier subject data index 118. The computing environment 101 can be configured to create or obtain a third amount of subject data for data objects 112 assigned to the warm tier, and the third amount of subject data can be greater than the second amount of subject data and less than the first amount of subject data such that the warm tier subject data index 116 is smaller in size than the hot tier subject data index 114 and greater in size than the cold tier subject data index 118. Likewise, each of any desired number of intermediate tiers can have a corresponding intermediate tier subject data index that has a size greater the size of the cold tier subject data index 118 and less than the size of the hot tier subject data index 114.

The computing environment 101 can be configured to classify or assign data objects 112 to corresponding index tiers (e.g., hot tier, warm tier, and/or cold tier) by, at least in part, applying one or more algorithms, machine learning models, or other techniques to the data objects 112. This functionality is represented in FIG. 1 by the sorting service 108.

The system 100 (e.g., the computing environment 101) can receive a search input, such as a set of terms or phrases, and index historical communication data to return items that are similar to the search input (e.g., regardless of whether any of the returned items share any of the terms or phrases of the search input). For example, the computing environment 101 can receive, from a computing device 130, a search input including a key phrase in English. The system (e.g., the computing environment 101) can analyze historical communication data (e.g., stored data objects or a subject data index 114, 116, 118 associated therewith) based on the key phrase and can identify data objects 112, historical documents, or historical communications in any language (e.g., in English and German) that demonstrate a high degree of semantic similarity. Continuing the example, the computing environment 101 can transmit to the computing device 130 the semantically similar data objects 112, documents, and/or communications.

Figure 2:
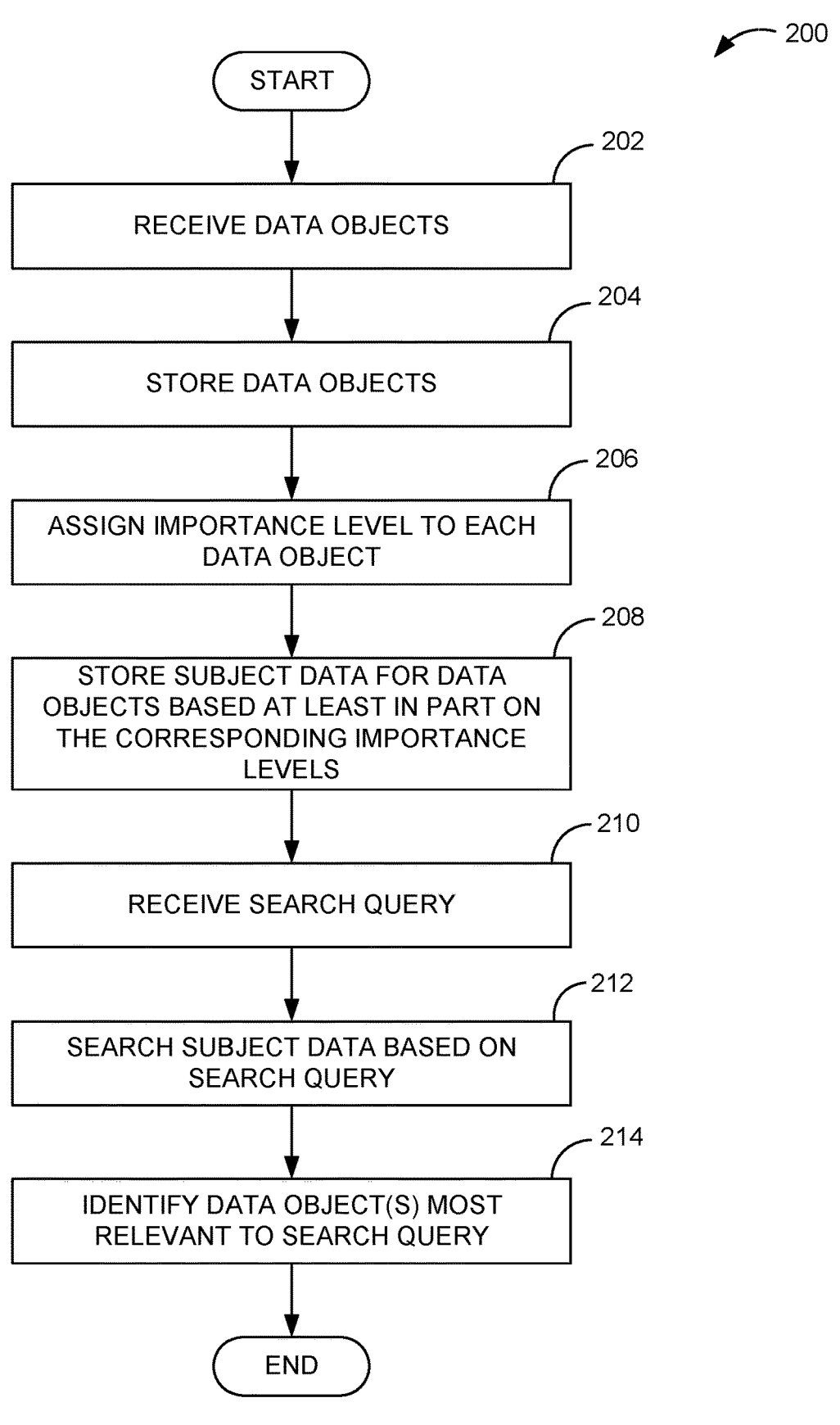
FIG. 2 shows an example method for indexing data, in accordance with the disclosed technology.

Referring now to FIG. 2, a flow chart for an example method 200 is depicted. One, some, or all of the various steps described in the method 200 can be performed in whole or in part by various components described herein, such as by computing environment 101. The disclosed methods are not necessarily restricted to the order in which they are expressly described herein. In contrast, one or more steps can be performed in a different order, and/or two or more steps can be performed in parallel (e.g., at substantially the same time). Further, it is contemplated that all steps expressly described need not be included to perform the method 200. Stated otherwise, various steps described herein can be omitted from the method 200.

The method 200 can include receiving 202 data objects (e.g., data objects 112). For example, the data objects can be received from one or more computing devices (e.g., computing device(s) 130), servers, third-party systems, or the like. The data objects can be received via any network or device connection (e.g., network 120). The data can be captured while monitoring communications on a network across a variety of communication modalities. The data can be loaded from an archive of storage. The data can correspond to a dataset from an eDiscovery system, a communication system (e.g., email service provider), or any other source. The method 200 can include storing 204 the data objects in some form of memory (e.g., data store 110).

The method 200 can include assigning 206 an importance level to each data object (e.g., determining an appropriate policy for each data object). As shown in more detail in FIG. 3, assigning the importance level of each data object can include analyzing 302 each data object and/or subject data associated with the data object(s). As an example, one or more data objects can comprise an audio file, and analyzing 302 the data objects can include capturing or receiving audio files and applying one or more speech-to-text algorithms or techniques to generate a textual string indicative of natural language recorded in the audio files (e.g., via communication service 106). The text string can be saved as subject data and/or can be further evaluated under this analysis step 302. For example, analyzing 302 the data object and/or subject data can include analyzing various data considerations/ attributes, such as the source of the data object, the sender of the data object, the recipient of the data object, the file creation date of the data object, the most recent modification data of the data object, the transmission date of the data object, the receipt date of the data object, the version of the data object (e.g., document version), the existence or non-existence of one or more keywords included in the data object, the term frequency of one or more terms, or any cross-references to a given data object by other data objects.

These various attributes can be used to determine 304 the importance level for each data object. As will be appreciated, the importance level of each data object can refer to relevance of a given data object to a particular purpose or scenario and/or the likelihood that the given data object will be accessed (e.g., by a cloud computing user, customer, or other third party). The particular purpose or scenario can be predetermined ro user inputted. As a non-limiting example, the relevance of each data object can be based on the application of various rules, which can relate to the aforementioned data considerations/attributes. Based on these rules, the method 200 can include generating a relevance score for each data object. Alternatively or in addition, the method 200 can include applying a machine learning algorithm to the data objects to evaluate the relevance of each data object to the particular purpose or scenario.

Based on the determinations made in step 304, the method 200 can include designating 306 the most important data objects as hot tier data objects (e.g., assign the most important data objects to a first tier) and designating 308 the least important data objects aws cold tier data objects (e.g., assign the least important data objects to a second tier). In some instances, it can be useful to include more than two tiers, such as one or more interdiate tiers. Thus, the method 200 can include designating 310 data objects with an intermediate importance (e.g., having an importance between that of the most important data objects and the least important data objects) as warm tier data objects (e.g., assign the data objects of intermediate importance to a third tier).

As previously mentioned, determining 304 the importance level for each data object can include generating a relevance score for each data object. In such cases, designating 306, 308, 310 the importance level of the various data objects can include comparing the relevance score of each data object to one or more thresholds (e.g., policy thresholds). The system (e.g., computing environment 101) can reevaluate the importance level of the various data objects over time (e.g., reevaluate the currently appropriate policy for each data object) as the relevance of data is likely to shift depending on team needs (e.g., the needs of one or more users). For example, data archived from five years ago is likely to have a low likelihood of being accessed, and thus may be assigned to a cold tier. If a lawsuit is filed for actions that occurred five years ago, the likehood that the data is accessed may increase dramatically. Accordingly, the system can detect the increase in the likelihood of the data being access, such as, for example, based on an increase in the number of times the data is being accessed, a selection or identification of the data for inclusion in a hold notification or eDiscovery system, based on analyzing communications regarding the law suit, or through one or more other detection methods. When a likelihood of being accessed (e.g., importance level) for a data object increases, the system can move the data object to a warmer tier, which can be referred to "heating up" the data object. Stated differently, the system can apply an updated policy (e.g., a "warmer" policy, such as moving from the second policy to the first policy or third policy described herein) to the particular data object to increase the breadth and/or inclusivity of the applicable indexing parameters, storage parameters, and/or retention parameters for the particular data object. Moving the data object to a warmer tier can include generating additional subject data. Moving the data object to a warmer tier can include moving the storage of the data object to a faster storage medium (e.g., moving the storage of the data object from tape drive storage to hard drives).

Similarly, when a likelihood of being accessed (e.g., importance level) for a data object decreases, the system can move the data object to a colder tier, which can be referred to "cooling down" the data object. Stated differently, the system can apply an updated policy (e.g., a "cooler" policy, such as moving from the first policy to the second policy or third policy described herein) to the particular data object to decrease the breadth and/or inclusivity of the applicable indexing parameters, storage parameters, and/or retention parameters for the particular data object. Moving the data object to a colder tier can include deleting or reducing the stored subject data. Moving the data object to a colder tier can include moving storage of the data object in a slower but less expensive storage medium (e.g., moving the storage of the data object from an Small Computer System Interface (SCSI) drive to a tape drive).

The thresholds can be predetermined or user inputted. For example, any data objects having a relevance score greater than or equal to a first threshold can be a hot tier data objects, and any data objects having a relevance score less than a second threshold can be cold tier data objects. The first threshold and the second threshold can be the same threshold (e.g., if there are only two tiers). Alternatively, the second threshold can be less than the first threshold. Further, any data objects having a relevance score less than the first threshold and greater than or equal to the second threshold can be warm tier data objects. As will be appreciated, the disclosed technology can include any number of intermediate tiers, although only a single intermediate or warm tier is expressly described herein.

Returning back to FIG. 2, the method 200 can include storing 208 subject data for some or all data objects based at least in part on the determined importance levels or assigned tiers (and/or the currently applicable policy for each data object). The more important or relevant that a data object is, the greater the amount of corresponding subject data that can be stored. For example, hot tier data objects can have the largest amount of corresponding subject data (e.g., the largest file size of subject data, the greatest number of types of subject data, the most granular of subject data information), cold tier data objects can have the smallest amount of corresponding subject data (e.g., the smallest file size of subject data, the smallest number of types of subject data, the least granular of subject data information), and warm tier data objects can have an intermediate amount of corresponding subject data (e.g., an intermediate file size of subject data, an intermediate number of types of subject data, an intermediate granularity of subject data information). Accordingly, memory can be saved by limiting the amount of subject data stored in relation to data objects that unlikely to be useful or relevant or least likely to be accessed (e.g., cold tier data objects) without comprising the searchability of data objects that are highly like to be useful or relevant or most likely to be accessed (e.g., hot tier data objects).

Furthermore, storing 208 subject data can include obtaining, retrieving, extracting, and/or generating subject data. For example, various types of subject data can be received (e.g., from a computing device 130 or third party data source). As another example, the method 200 can include deriving one or more types of subject data from the data object or another data source. As an illustrative example, a particular data object can comprise an audio file, and the method 200 can include determining whether an audio file contains multiple speakers, determining a voice signature corresponding to each of the speakers, determining an identity associated with the voice signature(s), and/or generating subject data for the audio file, such as by applying a speech-to-text algorithm to generate a textual string corresponding to natural language recorded in the audio file and/or identifying subsets of the audio file that correspond to each speaker. Alternatively or in addition, the method 200 can include analyzing background noises recorded in the audio file to determine the likely sources of such noises, identify a location of one or more of the speakers (e.g., based on the background noises and/or context from the words spoken by one or more of the speakers), and generating subject data indicative of the same. Regardless, the amount of subject data stored for a given data object (whether received, obtained, or generated) can be based at least in part on the importance level (or currently applicable policy) of that particular data object.

The subject data associated with the hot tier data objects can be indexed into a hot tier subject data index (e.g., hot tier subject data index 114), the subject data associated with the warm tier data objects can be indexed into a warm tier subject data index (e.g., warm tier subject data index 116), and/or the subject data associated with the cold tier data objects can be indexed into a cold tier subject data index (e.g., cold tier subject data index 118).

The method 200 can include receiving 210 a search query (e.g., from a computing device 130) and can include searching 212 the subject data (e.g., hot tier subject data index, warm tier subject data index, cold tier subject data index), such as by a search engine. The searching 212 step can include searching the subject data to determine which documents match (or best match) the search criteria of the search query without having to parse the data objects themselves. Based on this search, the method 200 can include identifying 214 one or more data objects that are most relevant to the search query. The method 200 can include outputting these results (e.g., to the computing device 130).

Referring now to FIG. 4, a flow chart for an example method 400 for determining whether the tier to which a stored data object (e.g., data object 112) is associated is still accurate. One, some, or all of the various steps described in the method 400 can be performed in whole or in part by various components described herein, such as by computing environment 101. The disclosed methods—including method 400—are not necessarily restricted to the order in which they are expressly described herein. In contrast, one or more steps can be performed in a different order, and/or two or more steps can be performed in parallel (e.g., at substantially the same time). Further, it is contemplated that all steps expressly described need not be included to perform the method 400. Stated otherwise, various steps described herein can be omitted from the method 400.

The method 400 can be performed on a regular basis (e.g., once every predetermined duration), or the method 400 can be performed in response to a trigger occurring. For example, data archived several years ago may be currently assigned to a cold tier. If a lawsuit is filed for actions that occurred several years ago (as a non-limiting example), the likelihood that the data will be accessed may increase dramatically. Accordingly, the method 400 can include detecting a trigger that can indicate a potential increase in the likelihood of the data being accessed, such as, for example, detecting an increase in the number of times the data is being accessed (e.g., total number of times, number of times during a predetermined period), detecting a selection or identification of the data for inclusion in a hold notification or eDiscovery system, receiving a notification from a user or a third party, analyzing communications associated with the data object (e.g., communications regarding the lawsuit in the example above), or through one or more other detection methods.

Regardless of the mechanism for the beginning the method 400, the method 400 can include determining 402 a current tier associated with a particular data object. Continuing the above example, a data object can be currently assigned to a cold tier. The method 400 can include analyzing 404 the data object. The step 404 can include some or all of the various steps, actions, and the like discussed herein with respect to step 302. As non-limiting examples, analyzing 404 the data object can include analyzing various data considerations/attributes of or associated with the data object or subject data associated therewith, such as the source of the data object, the sender of the data object, the recipient of the data object, the file creation date of the data object, the most recent modification data of the data object, the transmission date of the data object, the receipt date of the data object, the version of the data object (e.g., document version), the existence or nonexistence of one or more keywords included in the data object, the term frequency of one or more terms, or any cross-references to a given data object by other data objects.

The method 400 can include determining 406 an importance level (or currently applicable policy) for the data object. This determination can be based at least in part on the analysis performed at step 404. The step 406 can include some or all of the various steps, actions, and the like discussed herein with respect to step 304. In particular, determining 406 the importance level for the data object can refer to the current relevance of a given data object to a particular purpose or scenario and/or the current likelihood that the given data object will be accessed (e.g., by a cloud computing user, customer, or other third party).

The method 400 can include comparing the determined importance level (e.g., the importance level determined at step 406) to the importance level associated with the current tier of the data object. As indicated by decision block 410, the method 400 can include determining whether the current tier is accurate. If the current tier is accurate (e.g., the determined importance level is the same as that of the current tier, the determined importance level is within a predetermined level of similarity to that of the current tier, the determined importance level is within a predetermined range of importance levels associated with the current tier), the method 400 can include maintaining 412 the current tier association for the data object. Alternatively, if the current tier is not accurate (e.g., the determined importance level is different from that of the current tier, the determined importance level is below the predetermined level of similarity to that of the current tier, the determined importance level is outside of the predetermined range of importance levels associated with the current tier), the method 400 can include modifying the tier association for the data object. The method 400 can include determining 414 if the data object should be heated up or moved to a warmer tier (e.g., if the determined importance level is greater than that of the current tier) or if the data object should be cooled down or moved to a colder tier (e.g., if the determined importance level is less than that of the current tier). Depending on the determination made at step 414, the method 400 can include heating up 416 the data object or cooling down 418 the data object, as discussed in more detail with respect to FIGS. 5 and 6.

Stated otherwise, if the current relevance of the data object to the particular purpose or scenario and/or the current likelihood that the given data object will be accessed has increased over time (e.g., the determined importance level is greater than that of the current tier), the method 400 can include heating up 416 the data object (e.g., moving the data object to a warmer tier). As shown in FIG. 5, heating up 416 the data object can include generating 502 (or otherwise obtaining) additional subject data based at least in part (or otherwise associated with) the data object when a data object is being heated up. For example, the additional subject data can include the source of the data object, the sender of the data object, the recipient of the data object, the file creation date of the data object, the most recent modification data of the data object, the transmission date of the data object, the receipt date of the data object, the version of the data object (e.g., document version), the existence or nonexistence of one or more keywords included in the data object, the term frequency of one or more terms, or any cross-references to a given data object by other data objects. In the case of a data object being or comprising an audio file, the subject data can include one or more textual strings corresponding to natural language recorded in the audio file, an indication of a voice signature or identity corresponding to each of the speakers recorded in the audio file, an indication of one or more subsets of the audio file that correspond to each speaker, an indication of the likely sources of background noises recorded in the audio file, an indication of a location of one or more of the speakers (e.g., based on the background noises and/or context from the words spoken by one or more of the speakers), a time of the call, a duration of the call, etc. Alternatively or in addition, generating 502 (or otherwise obtaining) additional subject data can include identifying, receiving, and/or obtaining data (e.g., third-party data) relevant to the data object.

Alternatively or in addition, heating up 416 the data object can include moving 504 storage of the data object and/or the subject data associated therewith to a faster storage medium. For example, the method 400 can include moving 504 storage of the data object and/or subject data from tape drive storage to hard drives. As will be appreciated, moving storage to a faster storage medium can result in increased storage costs but can also provide faster search results and/or increased searchability.

Alternatively or in addition, heating up 416 the data object can include normalizing 506 the data object and/or subject data associated therewith, such as the additional subject data (e.g., subject data generated or obtained at step 502). For example, normalizing 506 can include ensuring that common fields among the various data objects and/or various types of subject data associated therewith have common values, consistent rankings, consistent scores, or the like. Alternatively or in addition, normalizing 506 the data object and/or subject data associated therewith can be performed to provide components or data elements that include, for example, participants of the communication, the role of some or all of the participants of the communication, text-based communication data (e.g., plain text, HTML), non-text-based communication data (e.g., audio data, video data, Microsoft Word document data, Microsoft Excel document data), and/or miscellaneous communication metadata (e.g., start/end times, subject, direction, type).

Alternatively or in addition, heating up 416 the data object can include performing 508 data enrichment in relation to the data object and/or subject data associated therewith. For example, performing 508 data enrichment can include locating similar and/or relevant topics in a conversation or a transcript of a conversation. Alternatively or in addition, performing 508 data enrichment can include, for example, identifying participants as internal or external (e.g., with respect to one or more particular organizations). Alternatively or in addition, performing 508 data enrichment can include determining if a communication endpoint of the data object (e.g., an email address, a login or username, a phone number, or some other type of contact/user information) is associated with a user who is internal to, or otherwise associated with, the organization. For example, this can include determining if a communication endpoint of the data object is mapped to an internal user in the organization's directory. If a communication endpoint is associated with an internal user, performing 508 data enrichment can include retrieving information associated with the identified internal user (e.g., directory information from the organization that is associated with the identified internal user, which can include, as non-limiting examples, the identified internal user's name, group affiliation(s), location, and/or department) and adding the retrieved information to the participant record in the communication (e.g., in the normalized data). The enriched participant information can be searched and used by archiving/supervision policies, such as those discussed herein.

Alternatively, if the current relevance of the data object to the particular purpose or scenario and/or the current likelihood that the given data object will be accessed has decreased over time (e.g., the determined importance level is less than that of the current tier), the method 400 can include cooling down 418 the data object (e.g., moving the data object to a colder tier). As shown in FIG. 6, cooling down 418 the data object can include reducing 602 or deleting subject data associated with the data object. Thus, the file size and storage costs associated with the data object can be reduced. Alternatively or in addition, cooling down 418 the data object can include moving 604 storage of the data object or subject data to a slower storage medium. For example, the method 400 can include moving 604 storage of the data object or subject data from a Small Computer System Interface (SCSI) drive to a tape drive. As will be appreciated, moving storage to a slower storage medium can result in slower search results and/or decreased searchability but can also decrease storage costs, which can be advantageous for data that is unlikely to be accessed or useful for the particular purpose or scenario.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

As a non-limiting example, utilizing a machine learning algorithm for any step or process described herein can include training a model using the machine learning algorithm. Training the model can include automatically adjusting one or more parameters of the machine learning algorithm to reduce or minimize the difference between the model's predicted output and its actual output. Once the model's accuracy is above a predetermined level, the model can be deployed to thereto apply the model to data of interest. While the model is deployed, the model can be configured to subsequently (or continually) improve. For example, during deployment, the model can compare previous output (e.g., previous predictions regarding a relevancy of a particular data object) to the actual results (e.g., the number of times the particular data object was accessed). Based on such comparisons, the machine learning algorithm can be configured to adjust one or more parameters of the machine learning algorithm to reduce or minimize the difference between the model's predicted output and its actual output.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A method comprising:

determining, via one of one or more computing devices, an importance score associated with each of a plurality of data objects based on one or more attributes associated with each of the plurality of data objects;

determining, via one of the one or more computing devices, an initial importance level for each of the plurality of data objects based at least in part on a comparison of each corresponding importance score to one or more threshold values, wherein:

the initial importance level is selected from an importance level list comprising a high initial importance level and a low initial importance level;

the high initial importance level corresponds to any importance score that is greater than or equal to a first threshold; and the low initial importance level corresponds to any importance score that is less than a second threshold;

designating, via one of the one or more computing devices, each of the plurality of data objects to one of a plurality of tiers comprising a first tier and a second tier, wherein each data object having the high initial importance level is designated as a first-tier data object of the first tier and each data object having the low initial importance level is designated as a second-tier data object of the second tier;

indexing, in a data store, subject data for the plurality of data objects by at least:

for each first-tier data object, indexing subject data associated with the corresponding first-tier data object according to first-tier indexing parameters, wherein the first-tier indexing parameters comprise a first amount of subject data associated with each corresponding first-tier data object; and for each second-tier data object, indexing subject data associated with the corresponding second-tier data object according to second-tier indexing parameters, wherein the second-tier indexing parameters are different from the first-tier indexing parameters and comprise a second amount of subject data associated with each corresponding second-tier data object, the second amount of subject data for a given data object being less than the first amount of subject data for the given data object; and re-designating, via one of the one or more computing devices and based on determining a subsequent importance level for a particular data object of the plurality of data objects is different from the initial importance level for the particular data object, the particular data object to a different tier.

2. The method of claim 1, wherein re-designating the particular data object to a different tier comprises:

in response to determining, via one of the one or more computing devices, that the subsequent importance level of the particular data object is less than the initial importance level of the particular data object:

re-designating, via one of the one or more computing devices, the particular data object from a first-tier data object to a second-tier data object; and indexing, via one of the one or more computing devices and in the data store, the subject data associated with the particular data object according to the second-tier indexing parameters; and in response to determining, via one of the one or more computing devices, that the subsequent importance level of the particular data object is greater than the initial importance level of the particular data object:

re-designating, via one of the one or more computing devices, the particular data object from a first-tier data object to a second-tier data object; and indexing, via one of the one or more computing devices and in the data store, the subject data associated with the particular data object according to the first-tier indexing parameters.

3. The method of claim 2, wherein re-designating the particular data object from a first-tier data object to a second-tier data object comprises deleting at least a portion of the subject data associated with the particular data object.

4. The method of claim 2, wherein re-designating the particular data object from a second-tier data object to a first-tier data object comprises generating or obtaining, via one of the one or more computing devices, additional subject data associated with the particular data object.

5. The method of claim 1, wherein the first-tier indexing parameters comprise storing the subject data associated with the corresponding first-tier data objects on a first storage medium having a first data access speed and the second-tier indexing parameters comprise storing the subject data associated with the corresponding first-tier data objects on a second storage medium having a second data access speed, the second data access speed being less than the first data access speed.

6. The method of claim 5, wherein re-designating the particular data object from a first-tier data object to a second-tier data object comprises moving, via one of the one or more computing devices, storage of the subject data associated with the particular data object from the first storage medium to the second storage medium.

7. The method of claim 5, wherein re-designating the particular data object from a second-tier data object to a first-tier data object comprises moving, via one of the one or more computing devices, storage of the subject data associated with the particular data object from the second storage medium to the first storage medium.

8. A system comprising:

memory; and at least one computing device in communication with the memory, the at least one computing device being configured to:

determine an importance score associated with each of a plurality of data objects based on one or more attributes associated with each of the plurality of data objects;

determine an initial importance level for each of the plurality of data objects based at least in part on a comparison of each corresponding importance score to one or more threshold values, wherein:

the initial importance level is selected from an importance level list comprising a high initial importance level and a low initial importance level;

the high initial importance level corresponds to any importance score that is greater than or equal to a first threshold; and the low initial importance level corresponds to any importance score that is less than a second threshold;

designate each of the plurality of data objects to one of a plurality of tiers comprising a first tier and a second tier, wherein each data object having the high initial importance level is designated as a first-tier data object of the first tier and each data object having the low initial importance level is designated as a second-tier data object of the second tier;

index subject data for the plurality of data objects by at least:

for each first-tier data object, indexing, in the memory, subject data associated with the corresponding first-tier data object according to first-tier indexing parameters, wherein the first-tier indexing parameters comprise a first amount of subject data associated with each corresponding first-tier data object; and for each second-tier data object, indexing subject data associated with the corresponding second-tier data object according to second-tier indexing parameters, wherein the second-tier indexing parameters are different from the first-tier indexing parameters and comprise a second amount of subject data associated with each corresponding second-tier data object, the second amount of subject data for a given data object being less than the first amount of subject data for the given data object; and re-designate, based on determining a subsequent importance level for a particular data object of the plurality of data objects is different from initial importance level for the particular data object, the particular data object to a different tier.

9. The system of claim 8, wherein:

the first-tier indexing parameters comprise a first amount of metadata associated with the corresponding first-tier data objects and the second-tier indexing parameters comprise a second amount of metadata associated with the second-tier data objects;

assigning an importance level to each of the plurality of data objects further comprises:

assigning each of the plurality of data objects having an intermediate importance level as a third-tier data object; and indexing subject data for the plurality of data objects further comprises:

for each third-tier data object, indexing, via the at least one computing device, a fourth amount of subject data associated with the corresponding third-tier data object, the fourth amount of subject data being less than the first amount of subject data and greater than the second amount of subject data.

10. The system of claim 8, wherein determining the importance level for each of the plurality of data objects comprises determining, for each of the plurality of data objects, a likelihood that the corresponding data object will be accessed.

11. The system of claim 8, wherein determining the importance level for each of the plurality of data objects comprises determining a relevance of each of the plurality of data objects to a particular purpose or scenario.

12. The system of claim 11, wherein determining the relevance of each of the plurality of data objects to the particular purpose or scenario is based at least in part on a source of the data object, a sender of the data object, a recipient of the data object, a file creation date of the data object, a most recent modification data of the data object, a transmission date of the data object, a receipt date of the data object, a version of the data object, an existence or nonexistence of one or more keywords included in the data object, a term frequency of one or more terms, or cross-references to a given data object by others of the plurality of data objects.

13. The system of claim 11, wherein determining the relevance of each of the plurality of data objects to the particular purpose or scenario is based at least in part by applying a machine learning algorithm to the plurality of data objects.

14. A non-transitory computer-readable medium having instructions stored thereon that, when executed by at least one computing device, cause the at least one computing device to:

determine an importance score associated with each of a plurality of data objects based on one or more attributes associated with each of the plurality of data objects;

determine an initial importance level for each of the plurality of data objects based at least in part on a comparison of each corresponding importance score to one or more threshold values, wherein:

the initial importance level is selected from an importance level list comprising a high initial importance level and a low initial importance level;

the high initial importance level corresponds to any importance score that is greater than or equal to a first threshold; and the low initial importance level corresponds to any importance score that is less than a second threshold;

designate each of the plurality of data objects to one of a plurality of tiers comprising a first tier and a second tier, wherein each data object having the high initial importance level is designated as a first-tier data object of the first tier and each data object having the low initial importance level is designated as a second-tier data object of the second tier;

index subject data for the plurality of data objects by at least:

for each first-tier data object, indexing subject data associated with the corresponding first-tier data object according to first-tier indexing parameters, wherein the first-tier indexing parameters comprise a first amount of subject data associated with each corresponding first-tier data object; and for each second-tier data object, indexing subject data associated with the corresponding second-tier data object according to second-tier indexing parameters, wherein the second-tier indexing parameters are different from the first-tier indexing parameters and comprise a second amount of subject data associated with each corresponding second-tier data object, the second amount of subject data for a given data object being less than the first amount of subject data for the given data object; and re-designate, based on determining a subsequent importance level for a particular data object of the plurality of data objects is different from initial importance level for the particular data object, the particular data object to a different tier.

15. The non-transitory computer-readable medium of claim 14, wherein the instructions, when executed by the at least one computing device, further cause the at least one computing device to:

assign each of the data objects having an intermediate importance level as a third-tier data object by at least determining that the importance score for a given data object is less than the first threshold and is greater than or equal to the second threshold.

16. The non-transitory computer-readable medium of claim 14, wherein the instructions, when executed by the at least one computing device, further cause the at least one computing device to:

receive, via the at least one computing device, a search query;

search, via the at least one computing device, the subject data for the plurality of data objects to identify one or more data objects having a greatest relevance to the search query; and return, via the at least one computing device, an indication of the one or more data objects having the greatest relevance to the search query.

17. The non-transitory computer-readable medium of claim 14, wherein:

the first-tier indexing parameters comprise a first amount of metadata associated with the corresponding first-tier data objects and the second-tier indexing parameters comprise a second amount of metadata associated with the second-tier data objects.

18. The non-transitory computer-readable medium of claim 14, wherein:

the first-tier indexing parameters comprise a first amount of metadata associated with the corresponding first-tier data objects and the second-tier indexing parameters comprise a second amount of metadata associated with the second-tier data objects; and the first amount of subject data comprises different types of subject data as compared to the second amount of subject data.

* * * * *